United States Patent [19]

Willard

[11] Patent Number: 5,477,895
[45] Date of Patent: Dec. 26, 1995

[54] OUTLET METERING ASSEMBLY

[75] Inventor: George L. Willard, Hamilton, New Zealand

[73] Assignee: Carter Holt Harvey Plastic Products Group Limited, Hamilton, New Zealand

[21] Appl. No.: 275,708

[22] Filed: Jul. 18, 1994

[51] Int. Cl.⁶ .............................. B65B 1/04; B65B 3/04; B65B 31/00; B65B 3/00

[52] U.S. Cl. .............................. 141/22; 141/23; 141/319; 141/346; 141/366; 141/384; 222/434; 222/438

[58] Field of Search .............................. 141/18, 22, 23, 141/98, 311 R, 319, 320, 322, 346, 363, 364, 365, 366, 384, 391; 222/434, 437, 438, 454, 455, 457; 128/203.15; 604/158; 73/149, 426, 427, 429

[56] References Cited

U.S. PATENT DOCUMENTS

4,474,312  10/1984  Donoghue .............................. 222/438

Primary Examiner—Henry J. Recla
Assistant Examiner—Timothy L. Maust
Attorney, Agent, or Firm—Jacobson, Price, Holman & Stern

[57] ABSTRACT

An assembly or a container including such an assembly which allows powder contents to be dispensed into a cap prior to the removal of the cap, the position of the thread engaged cap relative to the body of the container determining, to some extent, the volume of the materials being dispensed, the container otherwise being closable prior to the removal of the cap with the dispensed contents.

20 Claims, 5 Drawing Sheets

OUTLET METERING ASSEMBLY

TECHNICAL FIELD

The present invention relates to improvements in and/or relating to containers for dispensable contents, outlet metering assemblies for such containers and related methods and means.

BACKGROUND ART

Various forms of closable outlet assembly have previously been proposed for controlling the out pouring of dispensable contents from a container, whether the contents be a powder, liquid or otherwise.

The present invention provides an outlet metering system for the dispensable contents from a container utilizing an outlet metering assembly which will at least provide an alternative to any existing arrangement.

DISCLOSURE OF THE INVENTION

In a first aspect the invention consists in a container having an outlet metering assembly engaged thereto to dispense metered amounts of a material from the container, said assembly comprising;

(I) as a subassembly, inner and outer members or assemblies (hereinafter respectively "inner member" or "outer member") wherein one of said inner and outer members, or an extension thereof, (the "fixed member"), is engaged to the container so that it is fixed relative to said container, the other of which is rotatable relative to both the fixed member and to the container, said subassembly providing manually actuable means to allow in use a user to effect such relative rotation, and wherein each of said inner and outer members has a port or ports (hereafter "port") capable of being brought in to and out of an open or closed relationship with the port or ports (hereafter "port") of the other respectively upon such rotation to allow or prevent, in use, a dispensing of the material from the container, and (II) a cup member capable of receiving material dispensed via said ports when in their open condition while said cup member is screw thread engaged with, yet disengagable from, said subassembly, and wherein there is provided a scale on one of said subassembly and said cup member to indicate as a result of their relative screw engaged condition the available receiving volume of the cup member for material allowed to drop from said container via said ports when in an open condition, rotational screwing of the cup member and thus its axial position relative to said subassembly being determinative of the quantity to be dispensed when said ports are in their open condition, and wherein the relative rotation of said inner and outer members to a closed condition in use allows the cup member to be removed with a metered amount of material contained therein.

Preferably said inner member is a barrel within the outer member.

Preferably said manually actuable means is accessible by a user's digit laterally of the rotational axis of said inner member with respect to said outer member.

Preferably said subassembly is screw engaged therewith.

Preferably said scale is on said subassembly.

Preferably said container contains a granulated or other particulate material.

Preferably said subassembly has a tamper evident ring which frangibly detaches from should the subassembly be unscrewed from the container body.

Preferably said outlet metering assembly has until first used to dispense a metered amount. A frangibly detachable tamper evident region preventing said manually actuable means from effecting said relative rotation from said closed relationship.

Preferably said subassembly comprises:

(i) a body member generally a tubular form having at least one outlet port, (ii) a barrel confined at least partly in said body member having a generally tubular form open at one end to, in use, receive and hold contents from said container yet having at least one outlet port, an internally threaded skirt defining member dependant from said body member into which an external thread of said cup member is engagable, wherein at least one of said skirt defining member and said body member includes a female thread to engage operatively a male threaded outlet of a container, and wherein at least one of said skirt defining member in said body member includes a lateral opening to allow manual rotation of said barrel.

In a second aspect the invention consists in an outlet motoring assembly for engagement to a container or engaged to a container to dispense metered amounts of a material from the container, said assembly comprising;

(I) as a subassembly, inner and outer members or assemblies (hereinafter respectively "inner member" or "outer member") wherein one of said inner and outer members, or an extension thereof, (the "fixed member") is engagable to said container, or is engaged thereto, so that, in use, it is fixed relative to said container, the other of which is rotatable relative to both the fixed member and to the container, said subassembly providing manually actuable means to allow in use a user to effect such relative rotation, and wherein each of said inner and outer members has a port or ports (hereafter "port") capable of being brought in to and out of an open or closed relationship with the port or ports (hereafter "port") of the other respectively upon such rotation to allow or prevent, in use, a dispensing of the material, and (II) a cup member capable of receiving material dispensed via said ports when in their open condition while said cup member is screw thread engaged with yet disengagable from said subassembly, and wherein there is provided a scale on one of said subassembly and said cup member to indicate as a result of their relative screw engaged condition the available receiving volume of the cup member for material allowed to drop from said subassembly via the ports when in an open condition, rotational screwing of the cup member and thus its axial position relative to said subassembly being determinative of the quantity to be dispensed when said ports are in their open condition, and wherein the relative rotation of said inner and outer members to a closed condition in use allows the cup-like member to be removed with a metered amount of material contained therein.

Preferably said inner member is a barrel within the outer member.

Preferably said manually actuable means is accessible by a user's digit laterally of the rotational axis of said inner member with respect to said outer member.

Preferably said subassembly includes a thread to operatively engage a said container.

Preferably said scale is on said subassembly.

In yet a further aspect the present invention consists in an outlet metering assembly comprising (I) as a subassembly,
- a body member generally of a tubular form having at least one outlet port,
- a barrel at least partly confined in said body member having a generally tubular form open at one end to in use receive contents from a container but otherwise closed save for at least one outlet port capable upon axial rotation of said barrel within said body member of being brought into or out of a closed or open condition, said port of said barrel and body member being respectively out of alignment or in alignment, and
- a skirt defining member dependent from said body member which at least partly surrounds the lateral periphery of said body member, said skirt defining member being internally threaded, and wherein one of said skirt defining member and said body member includes an internal thread to engage a male thread of an outlet of a said container to allow and confine any contents of such a container to enter said barrel when said container is inverted, and (II) a cup member with an external thread engagable with the thread of said skirt defining member to, receive any material allowed to dispense from said ports when in their open condition, the effective receiving volume of said cup member varying as its axial position of engagement with said thread varies, and wherein said rotation of said barrel can be effected manually by a digit of a user on a region of said barrel accessible via a lateral opening of skirt defining member and/or said body member.

Preferably said skirt defining member has said internal thread to engage said container and has said lateral opening.

Preferably said accessible region of said barrel is or includes a projection which at least extends into said lateral opening to define by abutment rotational limits.

Preferably said cup member and said subassembly define a scale indicative of the effective receiving volume of said cup member to allow, when in use, the dumping a predetermined volume of material into the cup member via the ports.

Preferably said member to engage said container carries a frangible ring to encircle said spigot to provide a tamper evident feature in conjunction with an appropriate container.

Preferably the member defining said lateral opening includes a frangibly detachable tamper evident region preventing said relative rotating from said closed condition until removed.

In yet a further aspect the present invention consists in an outlet metering assembly of a component, or the components of such an assembly, which when combined operatively with an appropriate container body having an outlet will provide a container as previously set forth.

And yet a further aspect the present invention consists in the use of apparatus in accordance with the present invention.

And yet a further aspect the present invention consists in a method of dispensing granules or a powder from a container which involves the operative use of apparatus in accordance with the present invention.

BRIEF DESCRIPTION OF THE DRAWINGS

Preferred forms of the present invention will now be described with reference to the accompanying drawings in which.

Figure 12:
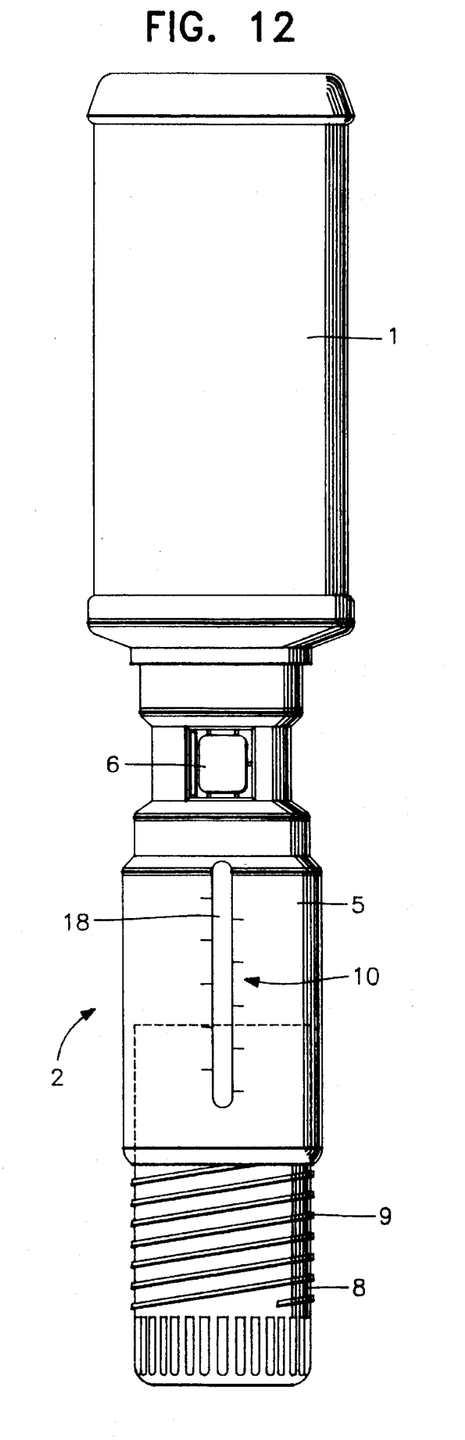
FIG. 12 illustrates the container and outlet metering assembly.

In the most preferred form the outlet metering assembly 2 is attached to a container 1 as shown in FIG. 12. Preferably the container and outlet metering assembly are disassembled prior to use. This allows the user of the invention to fill the container with a substance eg. granules, prior to use. This is of particular advantage when the type of granule that is to be dispensed is not particularly well stored for a long period in the container. This may for example include chemicals which are very hygroscopic.

The outlet metering assembly essentially consists of a fixed member, a movable member and a receiving member. In the most preferred form the movable member is the inner member 3 and the fixed member consists of two parts, these being the outer member 4 and the skirt 5. The skirt 5 and the outer member 4 effectively being one piece (ie non rotatable and non translatable relative to each other) but for manufacturing and assembly reasons are two pans. The receiving member is preferably a cup member 8. In the most preferred form as illustrated, the fixed member ie. the outer member and the skirt are rotatable fixed relative to the container 1 (once assembled together). The inner member is rotatable relative to the fixed member and container, however alternatively the inner member 3 may be fixed and the outer member 4 and skirt 5 may be rotatable relative to the container 1.

The inner member is preferably cup like in shape and has a set of pens 7 at the bottom.

The inner member 3 is located substantially inside the outer member 4 and is translatably fixed thereto by locating means, such means being for example a circumferential groove 16 and raise 17 on the outer member 4 and inner member 3 respectively. Said locating means allow the inner member 3 and outer member 4 to rotate but not translate relative to each other.

The outer member 4 is also substantially cup like in shape and has a set of ports 7 of identical shape to the inner member 3. The outer member is in the most preferred form located inside the skirt and rotatably and translatably fixed to the skirt 5.

Figure 1:
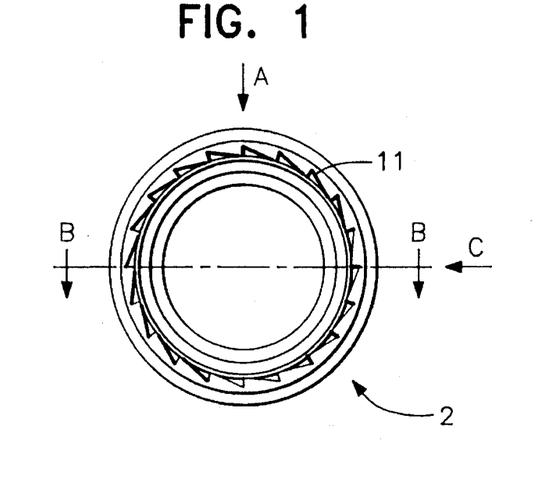
FIG. 1 is a plan view of the outlet metering assembly.
Figure 2:
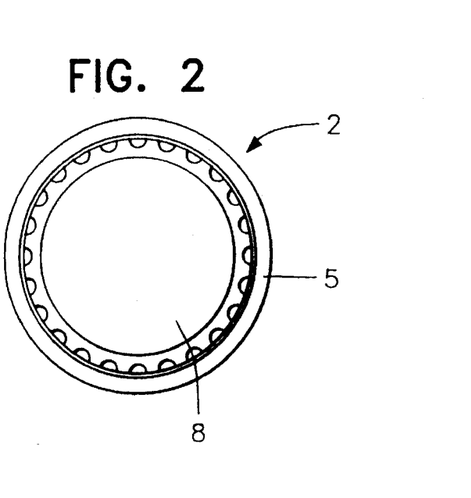
FIG. 2 is a bottom view of the outlet metering assembly.
Figure 3:
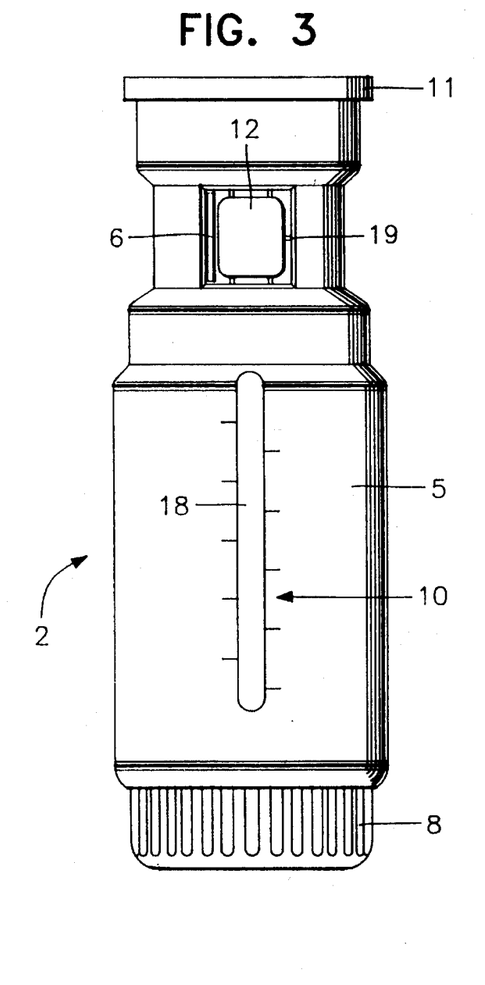
FIG. 3 is a side view of the outlet metering assembly as seen from direction A in FIG. 1.
Figure 4:
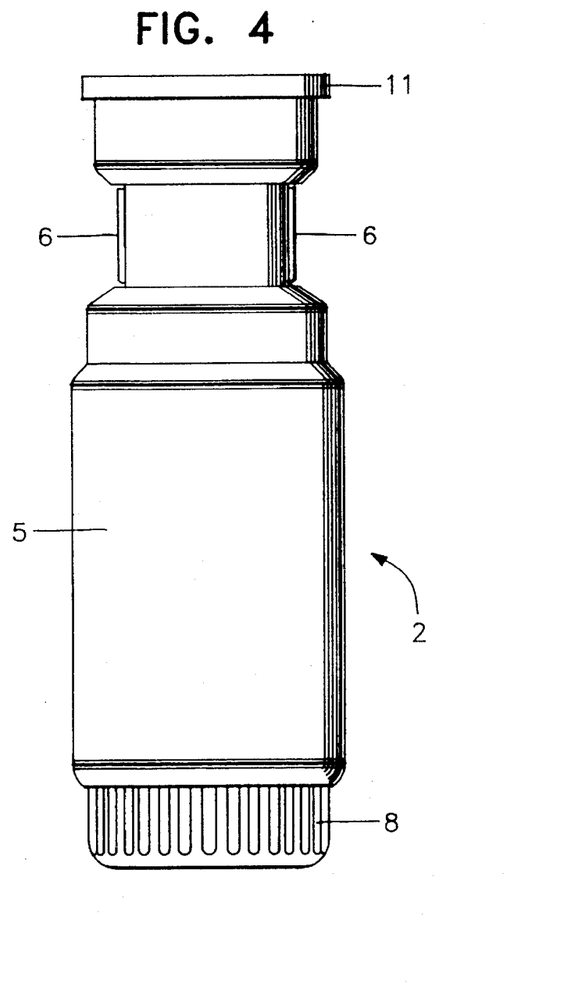
FIG. 4 is as side view of the outlet metering assembly as seen from direction c in FIG. 1.
Figure 5:
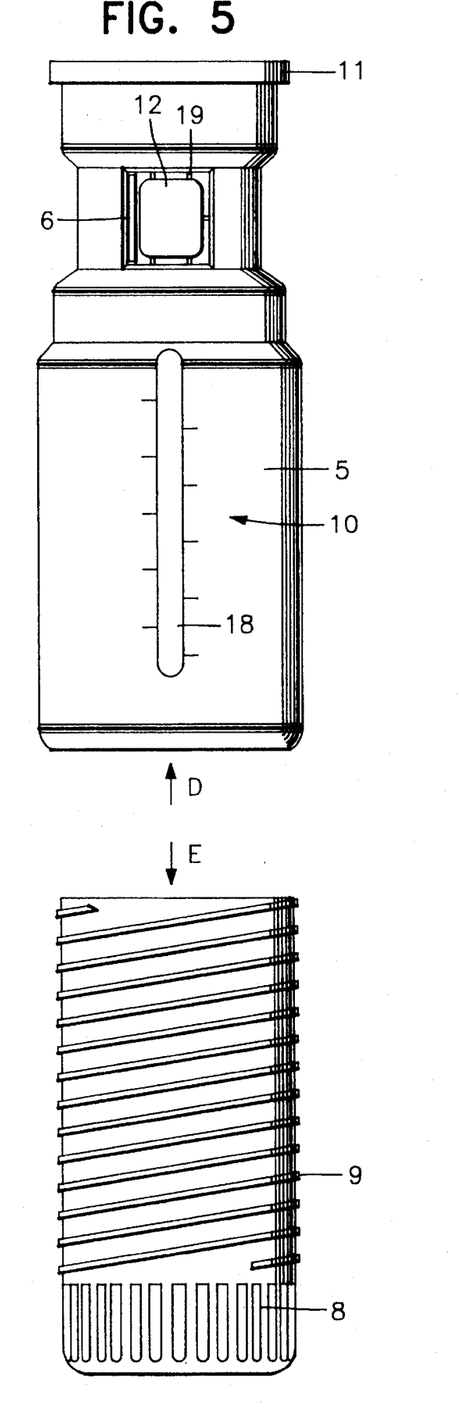
FIG. 5 is a partially exploded view of the outlet metering assembly.
Figure 6:
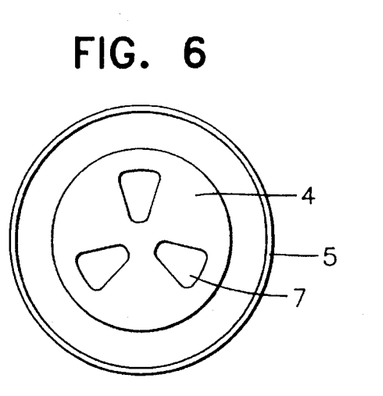
FIG. 6 is a plan view of FIG. 5 in the direction marked D in FIG. 5.
Figure 7:
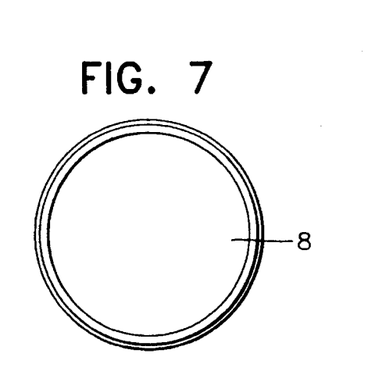
FIG. 7 is a plan view of FIG. 5 in the direction marked E in FIG. 5.
Figure 8:
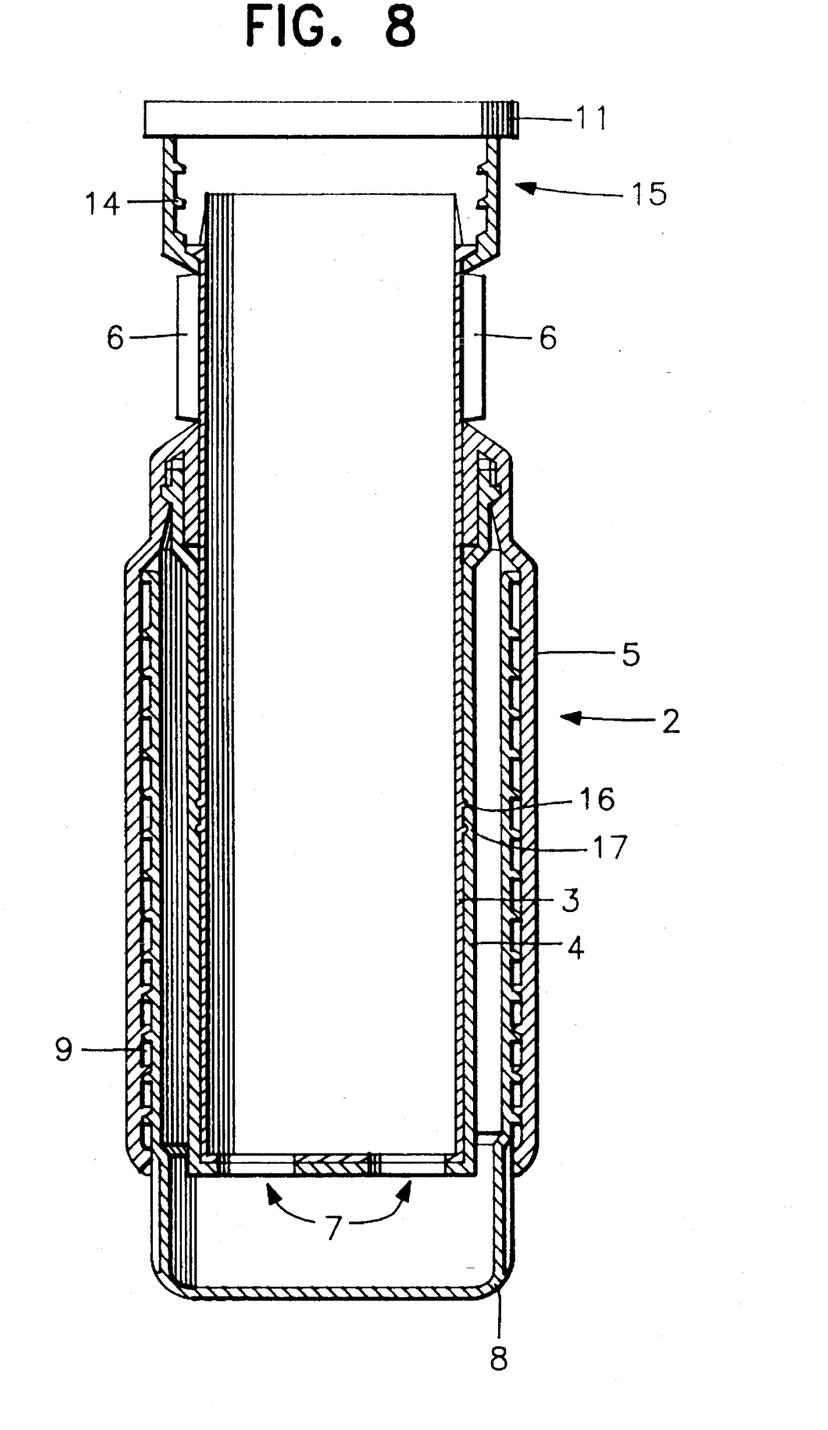
FIG. 8 is a cross-sectional view of the outlet metering assembly through B—B as shown in FIG. 1.
Figure 9:
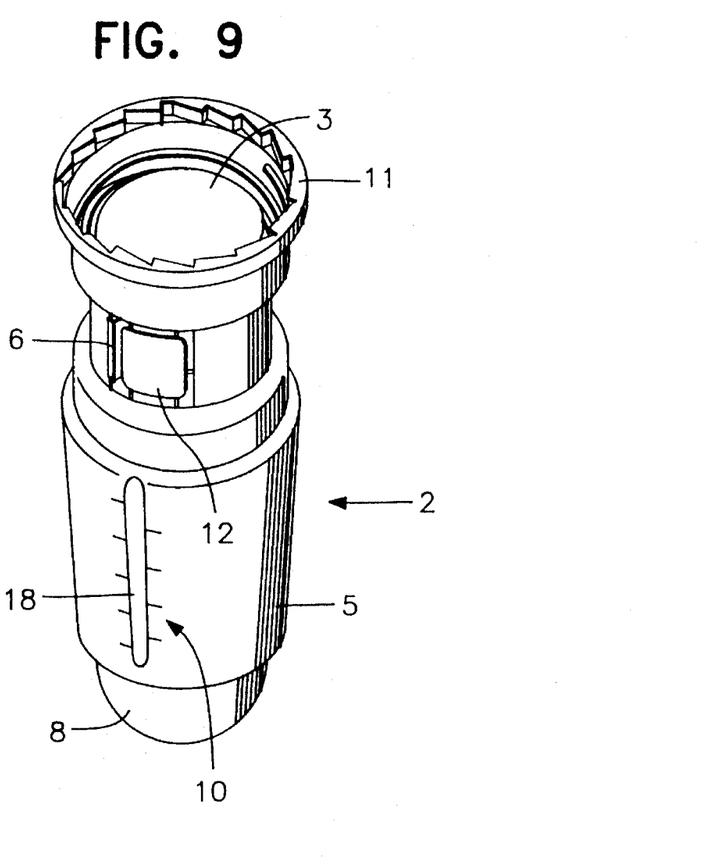
FIG. 9 is a perspective view of the outlet metering assembly.
Figure 10:
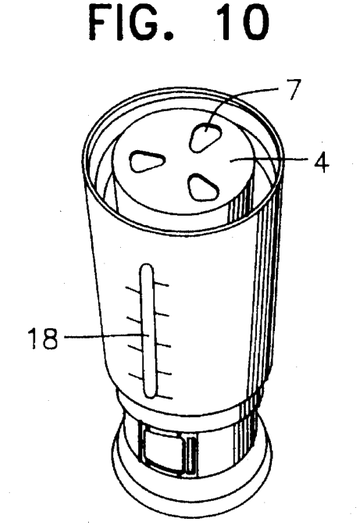
FIG. 10 illustrates a perspective view of the outlet metering assembly having the cup removed.
Figure 11:
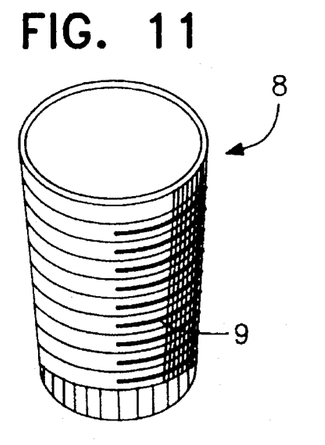
FIG. 11 illustrates a perspective view of the cup.

Rotation of the inner member relative to the outer member, aligns and non aligns the ports hence opening and closing the container access. Rotation of the inner member is achieved by way of a manually actuable means 6 secured to the inner member 3 actuated by for example a finger of the user. The manually actuable means 6 extends through a relief in the skirt 5 as best shown in FIGS. 8 and 9. The relief in the skirt is of such a size that it restricts the angle of rotation of the inner member 3 so as to fully align the ports 7 at one extreme of rotation of the inner member and to fully non align the ports 7 at the other extreme of rotation of the inner member. The manually actuable means 6 may not necessarily extend out through a relief in the skirt, it may alternatively extend through the container and out the bottom, or any other suitable location.

In the alternative arrangement where the inner member is rotatable fixed relative to the container, to align and non align the ports, the skirt 5 would need to be rotated (no manually actuable means would be required) relative to the container.

The ports do not necessarily need to be at the bottom of the inner and outer member but could alternatively be located in the walls.

As before mentioned the container 1 and outlet metering assembly 2 are preferably disassembled before the substance is placed in the container by the user. After placing the substance in the container 1 the outlet metering assembly 2 is secured to the container. In the most preferred form this is done by way of a screw thread 14 at the head 15 of skirt 5 of the outlet metering assembly 2. Alternatively the attachment may be by way of a snap fit means, adhesive or other suitable means. To ensure the outlet metering assembly 2 remains secured to the container 1 a ratchet type device 11 is attached to the head 15 allowing the skirt 5 of the outlet metering device 2 to be rotated in one direction only relative to the container. Once the container 1 and outlet metering assembly 2 are secured together the invention is ready to dispense predetermined quantities of the substance inside the container into the cup member 8.

The cup member 8 is preferably, but not necessarily, secured to the skirt 5 by means of a screw thread 9. The thread 9 may be internal on the skirt 5 and external on the cup member 8 or visa versa, however it is preferred that the thread 9 is external on the cup member 8 as this avoids any of the dispensed substance from locating between the thread 9.

The quantity of substance dispensed into the cup member 8 is determined by the volume in the cup member 8 and defined by the bottom and walls of the cup member 8 and substantially the bottom of the ports 7. The inner member is translatably fixed to the outer member and skirt and hence the volume (which is directly proportional to the distance between the bottom of the cup member 8 and the ports 7) of substance to be dispensed is predetermined by axial location of the skirt 5 and the cup member 8. This axial positioning between the skirt 5 and the cup member 8 is achieved by the engagement of the thread 9 and relative rotation between the skirt and cup member. The screw type action of the cup member 8 into the skirt 5 reduces the volume between the ports 7 and the bottom of the cup member 8 and visa versa.

A scale 10 directly proportional to the volume between the ports and the bottom of the cup member is located on the skirt member. A gauging means located on the cup member allows the quantity of substance to be dispensed from the container to be predetermined by aligning the gauging means with the desired scalar unit on the scale 10. In the most preferred form of the invention the gauging means is the upper rim of the cup member 8 and is visible through a sight area 18 of the skirt 5. However alternatively the scale may be located on the cup member 8 and the gauging means may be the bottom rim of the skirt or any other suitable fixture.

Figure 13:
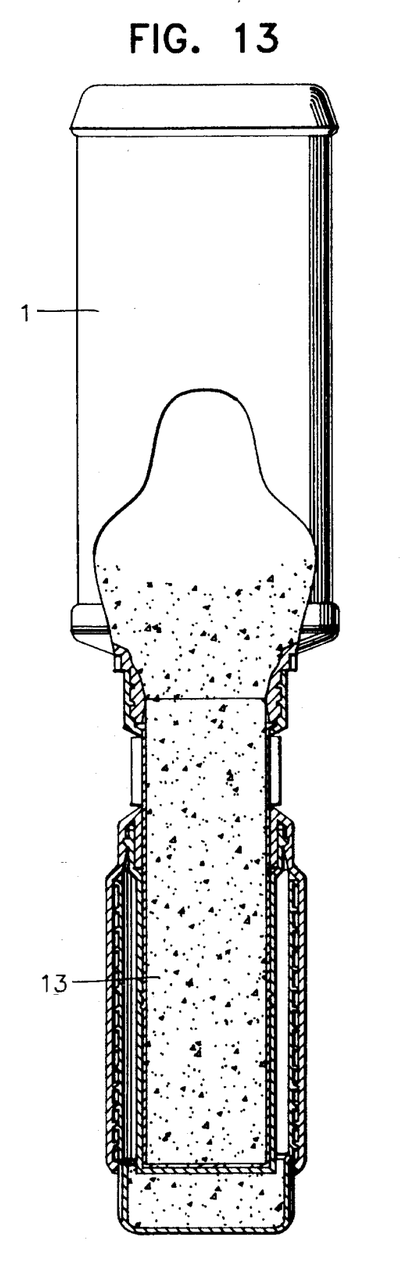
FIG. 13 is a partial sectional view of the container and outlet metering assembly.

To dispense a quantity of substance from the container 1 the desired quantity is firstly determined by setting the gauging means at the scalar unit corresponding to the desired volume by rotation of the cup member 8 relative to the skirt 5. It must be ensured that the ports 7 in the inner member 3 and outer member 4 are non aligned and hence closed. Turning the container 1 and outlet metering assembly 2 so the container 1 is substantially vertically above the outlet metering assembly 2, the ports 7 are opened by rotation of the inner member 3 relative to the outer member 4 using the manually actuable means 6 and hence allowing the desired quantity of substance to be transferred from the container 1 and inner member 3 into the cup member 8 as shown in FIG. 13. The ports should next be closed and the cup member 8 unscrewed from the skirt 5. The cup member 8 contains the desired quantity of substance ready for use.

The outlet motoring assembly can also dispense the substance at a predetermined mass by merely recalibrating the scale. The scale 10 on the skirt 5 is easily recalibrated at time of manufacture, for different substances of differing specific mass and granule size so as to allow the user to dispense a predetermined mass of substance accurately.

Preferably the outlet metering assembly has a tamper indicating means such as a removable tab 12 removable by breaking the connectors 19. In the form of the invention described in the figures the removable tab 12 locks the inner member in a position such that the ports are non aligned. To allow the ports 7 to be aligned the removable tab 12 must firstly be removed.

In the most preferred form of the invention the container 1 and outlet metering assembly 2 and components thereof are made of a plastic material suitable for containing, at least temporarily, the substance to be dispensed however certain or all components may be of a metallic or other suitable material.

Preferably the skirt 5 is made of a translucent plastic which will allow the gauging means to be clearly visible through at least the sight area (the sight area may hence merely be an area of reduced wall thickness in the translucent skirt).

The use of the invention ensures that substantially none of the substance to be dispensed is likely to disperse outside the boundaries of the outermost components by for example gusts of wind. This is of particular importance if the substance dispensed is harmful to eg. the user.

If it happens that the incorrect quantity of a substance has been dispensed into the cup member 8 the substance can be returned to the container by opening the ports and inverting the outlet metering assembly and container such that the substance is allowed to flow back into the container. Tests have shown that the quantity dispensed is accurate to within +/−3%.

In the most preferred form as shown in the representations the components of the outlet metering assembly are substantially cylindrical to allow the rotational and screw like engagement of components. Alternative forms envisaged include for example a conically shaped cup member which does not directly engage with the skirt but instead is located at a predetermined distance from the ports by a different means. Subsequently the skirt may not be necessary.

If the invention assumes an alternative arrangement whereby the manually actuable means is located elsewhere or is not at all present (as described herebefore) the appearance of the components of the invention may assume a different shape.

What is claimed is:

1. A container having an outlet metering assembly engaged thereto to dispense metered amounts of a material from the container, said assembly comprising;

inner and outer members wherein said outer member is engaged to the container so that it is fixed relative to said container, the inner member of which is rotatable relative to both the outer member and to the container, said assembly providing manually actuable means to allow, in use, a user to effect such relative rotation, and wherein said inner member has at least one port capable of being aligned with at least one port in said outer member upon such rotation to allow dispensing of said material from the container, a cup member capable of receiving material dispensed via said aligned ports and being threadedly engaged with said assembly such that said aligned ports are positioned within said cup member, wherein there is provided a scale on one of said outer member and said cup member relative to the position of said ports to indicate as a result of their relative screw engaged position with respect to each other the available receiving volume of the cup member for material allowed to drop from said container via said aligned ports, and wherein the relative rotation of said inner and outer members to move said ports out of alignment with respect to each other to prevent material from dropping into said cup member allows the cup member to be removed with a metered amount of material contained therein.

2. A container of claim 1 wherein said inner member is a barrel within the outer member.

3. A container of claim 1 wherein said manually actuable means is accessible by a user's digit laterally of the rotational axis of said inner member with respect to said outer member.

4. A container of claim 1 wherein said assembly is screw engaged about the container outlet.

5. A container of claim 1 wherein said scale is on said assembly.

6. A container of claim 1 containing a granulated or other particulate material.

7. A container of claim 4 wherein said assembly has a tamper evident ring which frangibly detaches should the assembly be unscrewed from the container.

8. A container of claim 7 wherein said outlet motoring assembly until first used to dispense a metered amount includes a frangibly detachable tamper evident region preventing said manually actuable means from effecting said relative rotation from said closed relationship.

9. A container of claim 1 wherein said assembly comprises a body member generally in a tubular form having at least one outlet port, a barrel confined at least partly in said body member having a generally tubular form open at one end to in use receive and hold contents from a said container yet having at least one outlet port, an internally threaded skirt defining member dependent from said body member into which an external thread of said cup member is engagable, wherein at least one of said skirt defining member and said body member includes a female thread to engage operatively a male threaded outlet of a container, and wherein at least one of said skirt defining member and said body member includes a lateral opening to allow manual rotation of said barrel.

10. An outlet motoring assembly for engagement to a container to dispense metered mounts of a material from the container, said assembly comprising;

inner and outer members wherein said outer member is engagable to said container, so that, in use, it is fixed relative to said container, the inner member of which is rotatable relative to both the outer member and to the container, said assembly providing manually actuable means to allow in use a user to effect such relative rotation, wherein said inner member has at least one port capable of being aligned with at least one port in said outer member upon such rotation to allow dispensing of said material, a cup member capable of receiving material dispensed via said aligned ports and being threadedly engaged with said assembly such that said aligned ports are positioned within said cup member, wherein there is provided a scale on one of said outer member and said cup member relative to the position of said ports to indicate as a result of their relative screw engaged position with respect to each other the available receiving volume of the cup member for material allowed to drop from said container via said aligned ports, and wherein the relative rotation of said inner and outer members to move said ports out of alignment with respect to each other to prevent material from dropping into said cup member allows the cup member to be removed with a metered amount of material contained therein.

11. An assembly of claim 10 wherein said inner member is a barrel within the outer member.

12. An assembly of claim 10 wherein said manually actuable means is accessible by a user's digit laterally of the rotational axis of said inner member with respect to said outer member.

13. An assembly of claim 10 wherein said assembly includes a thread to operatively engage said container.

14. An assembly of claim 10 wherein said scale is on said assembly.

15. An outlet metering assembly comprising:

a body member generally of a tubular form having at least one outlet port, a barrel at least partly confined in said body member having a generally tubular form open at one end to, in use, receive contents from a container and closed at an opposite end upon axial rotation of said barrel within said body member when said at least one outlet port of said body member and at least one outlet port of said barrel are out of alignment a skirt defining member having first and second ends, wherein said first end is adjacent said open end of said barrel and said second end is adjacent said closed end of said barrel and is dependent from said body member which at least partly surrounds a lateral periphery of said body member, and wherein said skirt defining member includes internal threads at said first end to engage male threads of an outlet of a said container to allow and confine any contents of such a container to enter said barrel when said container is inverted, and a cup member with external threads engagable with the threads of said second end of said skirt defining member to receive any material dispensed from each outlet port when aligned, an effective receiving volume of said cup member varying as its axial position of engagement with said skirt defining members threads varies, and wherein said rotation of said barrel manually controlled by a user on a region of said barrel accessible via a lateral opening of said skirt defining member.

16. An assembly of claim 15 wherein said skirt defining member has said internal threads to engage said container and has said lateral opening.

17. An assembly of claim 15 wherein said accessible region of said barrel includes a projection which at least extends into said lateral opening and is fixed to said barrel and defined by abutment rotational limits.

18. An assembly of claim 15 wherein said cup member and said assembly define a scale indicative of an effective receiving volume of said cup member to allow, when in use, a dumping of a predetermined volume of material into the cup member via the aligned outlet ports.

19. An assembly of claim 15 wherein said skirt defining member to engage said container carries a frangible ring to encircle an outlet of said container to provide a tamper evident feature in conjunction with an appropriate container.

20. An assembly of claim 18 wherein said skirt defining member defining said lateral opening includes a frangibly detachable tamper evident region preventing relative rotation of said barrel from a closed condition until removed.

* * * * *